April 19, 1960 H. B. STEGE 2,933,001
ADJUSTABLE AUTOMATIC CARRIAGE STOP (LATHE)
Filed Sept. 15, 1958 2 Sheets-Sheet 1
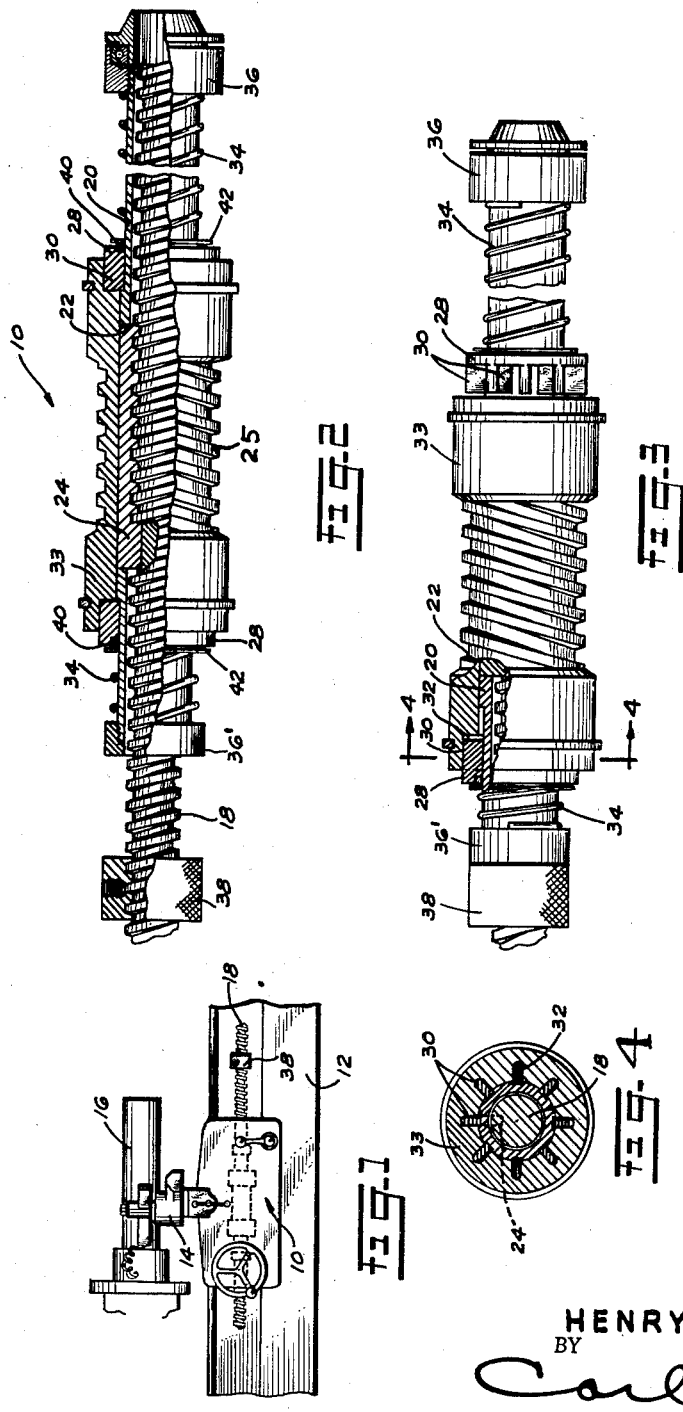
INVENTOR.
HENRY B. STEGE
BY
*Carl Miller*
ATTORNEY

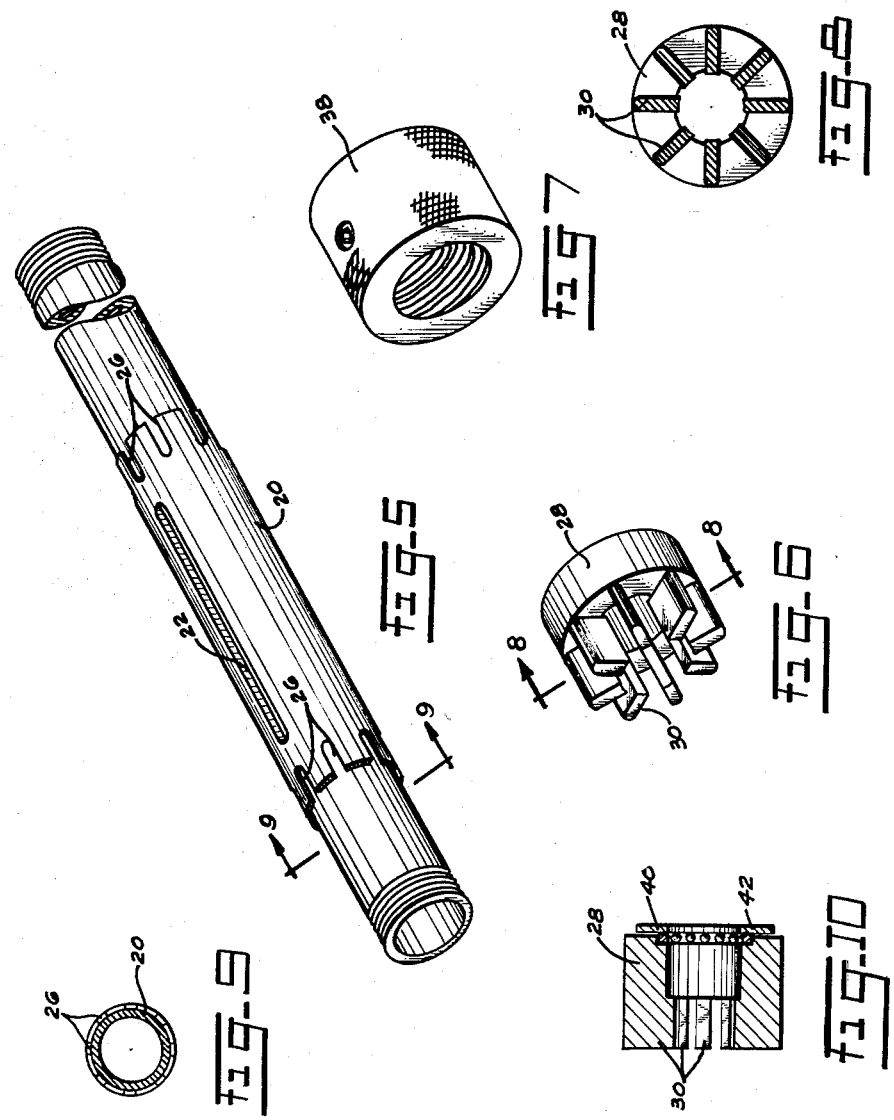

United States Patent Office 2,933,001
Patented Apr. 19, 1960

2,933,001

ADJUSTABLE AUTOMATIC CARRIAGE STOP (LATHE)

Henry B. Stege, Brooklyn, N.Y.

Application September 15, 1958, Serial No. 761,111

3 Claims. (Cl. 82—23)

This invention relates to machine tools and, more particularly, to lathes.

It has been found that an effective stop for a lathe carriage can prevent unnecessary damage to the equipment, the work piece, and the cutting tool. In some instances, a faulty stop can result in injury to the operator, as well as substantial damage to the equipment which not only is expensive, but also results in delays in production. It is therefore an object of the present invention to provide a completely effective and adjustable automatic carriage stop for lathes that is simple in construction, effective in operation, and which will overcome the aforementioned difficulties.

Another object of the present invention is to provide an adjustable carriage stop that will automatically disconnect the feed mechanism from the carriage in response to abutment of the carriage with an adjustable stop element mounted upon the feed screw.

Still another object of the present invention is to provide an adjustable automatic carriage stop for lathes of the type described which can be manufactured in large quantities at a relatively low cost, can be installed in new production models, and which can also be applied to existing equipment in a simple and efficient manner.

All of the foregoing and still further objects and advantages of this invention will become apparent from a study of the following specification, taken in connection with the accompanying drawing, wherein:

Figure 1 is a fragmentary side elevational view of a lathe embodying a carriage stop made in accordance with the present invention, in operative use;

Figure 2 is a side elevational view, partly broken away, of the carriage stop forming a part of the present invention;

Figure 3 is a view similar to Figure 2, showing the parts in an adjusted position;

Figure 4 is a transverse cross sectional view taken along line 4 of Figure 3;

Figure 5 is a perspective view of a sleeve element forming another part of the present invention;

Figure 6 is a perspective view of a clutch ring forming still another part of the present invention;

Figure 7 is a perspective view of an adjustable stop forming another part of the present invention;

Figure 8 is a cross sectional view taken along line 8 of Figure 7;

Figure 9 is a transverse cross sectional view taken along line 9—9 of Figure 6; and Figure 10 is a longitudinal cross sectional view of the clutch ring illustrated in Figure 7.

Referring now to the drawing, and more particularly to Figures 1 to 3 thereof, an adjustable automatic carriage stop 10 made in accordance with the present invention is shown in operative association with the bed 12 of a machine lathe having a work piece 16 mounted for rotation relative to the cutting tool 14 that is secured to the carriage which is moved longitudinally by the feed screw 18.

An elongated sleeve 20 is slidably supported upon the feed screw 18 and has a central longitudinal slot 22 into which a key 24 projects for direct engagement with the keyway of the feed screw 18 which secures the sleeve for rotation with the screw 18 but permits the sleeve to slide therealong. Thus, rotation of the feed screw 18 is operative to effect rotation of the sleeve 20 with the feed screw 18 through the direct engagement between the feed screw 18 and the key 24, so that the worm 25 adjacent to the sleeve drives a gear train (not shown) to move the carriage and the sleeve longitudinally along the feed screw 18. A plurality of reentrant longitudinal slots 26 equally spaced circumferentially of the sleeve 20 and spaced inwardly from each end thereof, slidably receive the finger plates 30 of a clutch ring 28 that is slidably supported upon each end of the sleeve 20. The finger plates 30 are also slidably received within reentrant openings 32 in the opposite ends of a yoke member 33 which drives the tool carriage 14 of the machine. Ordinarily, a compression spring 34 secured between each of the clutch rings 28 and a stop ring 36 threadedly carried upon the opposite extremities of the sleeve 20 urge the clutch rings into clutched engagement with the yoke and sleeve. As a result, rotation of the feed screw 18 is operative to effect rotation of the sleeve 20 and the yoke 33 because of the interlocking engagement of the finger plates 30 within the reentrant portions of each such members.

Limit stops 38 are secured in any desired position along the length of the feed screw 18 so as to control the distance of movement of the carriage. Ordinarily, rotation of the feed screw will effect longitudinal movement of the carriage. However, as soon as the stop element 36, 36' engages the limit stop 38 at either end of the assembly, continued rotation of the feed screw 18 is operative to cause the yoke 33 and clutch ring 28 to continue to move relative to the sleeve 20. This continued movement disengages the clutch ring 28 at the opposite end of the assembly, as shown in Figure 3, while simultaneously withdrawing the reentrant portions 26 from interlocking engagement with the finger plates 30 at the stopped end of the unit. Continued rotation of the feed screw 18 thus has no further effect upon the yoke 33.

In order to prevent wear between the spring 34 and each clutch ring 28, bearings 40 and bearing plate 42 provide a rotatable seat for the end of the spring 34 adjacent to each such clutch plate 28.

It will now be recognized that a completely automatic and adjustable carriage stop has been provided that will prevent damage to the machine and working parts, as well as increase efficiency and rate of production of any particular job.

While this invention has been described with particular reference to the construction shown in the drawing, it is to be understood that such is not to be construed as imparting limitations upon the invention, which is best defined by the claims appended hereto.

Having thus described my invention, I claim as new and desire to secure by Letters Patent:

1. An adjustable automatic carriage stop for lathes comprising, in combination, a sleeve slidably supported upon the feed screw of the lathe, a yoke rotatably supported upon said sleeve for longitudinal movement of said sleeve, a key slidably connecting said sleeve for longitudinal movement relative to the feed screw and for rotation therewith, clutch means releasably drivingly connecting said yoke for rotational and longitudinal movement with said sleeve, limit stops adjustably secured in longitudinally spaced apart relationship upon the feed screw for abutment upon opposite ends of said sleeve, said key being carried by said sleeve, said clutch means comprising a clutch ring slidably supported upon each end of said sleeve, said clutch ring having a plurality of clutch finger plates, and said sleeve and said yoke having reentrant portions at each end slidably receiving said finger plates therewithin.

2. An adjustable automatic carriage stop as set forth in claim 1, further comprising spring means acting between each clutch ring and an adjacent end of said sleeve yieldably urging said finger plates to said reentrant portions, whereby abutment of one end of said sleeve with one of said limit stops is operative to effect disengagement of said sleeve reentrant portions of said finger plates adjacent to said one end and to effect outward movement of said clutch ring at the opposite end of said sleeve relative to the reentrant portion of said yoke and sleeve adjacent to said opposite end.

3. An adjustable automatic carriage stop as set forth in claim 2, wherein said spring means comprises compression coil springs.

References Cited in the file of this patent

UNITED STATES PATENTS 590,736     Earle _____ Sept. 28, 1897